(12) United States Patent
No

(10) Patent No.: US 9,605,719 B2
(45) Date of Patent: Mar. 28, 2017

(54) POSITION OFFSET COMPENSATION METHOD OF CLUTCH FOR CONTROLLING POWER THAT IS TRANSMITTED FROM ENGINE TO WHEEL OF VEHICLE, AND CLUTCH POSITION CONTROL APPARATUS

(71) Applicant: HYUNDAI AUTRON CO., LTD., Seongnam-si (KR)

(72) Inventor: Jin-Won No, Seoul (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 0 days.

(21) Appl. No.: 14/961,126

(22) Filed: Dec. 7, 2015

(65) Prior Publication Data
US 2016/0169303 A1  Jun. 16, 2016

(30) Foreign Application Priority Data
Dec. 10, 2014  (KR) ........................ 10-2014-0177860

(51) Int. Cl.
*G06F 17/00* (2006.01)
*F16D 48/06* (2006.01)

(52) U.S. Cl.
CPC .... *F16D 48/06* (2013.01); *F16D 2500/10412* (2013.01); *F16D 2500/3026* (2013.01); *F16D 2500/3065* (2013.01); *F16D 2500/30412* (2013.01); *F16D 2500/30426* (2013.01); *F16D 2500/3166* (2013.01); *F16D 2500/7041* (2013.01)

(58) Field of Classification Search
None
See application file for complete search history.

(56) References Cited

U.S. PATENT DOCUMENTS 5,307,269 A * 4/1994 Kohno ................. F16D 48/066
192/82 T
5,322,150 A * 6/1994 Schmidt-Brucken . F16D 48/066
477/175
(Continued)

FOREIGN PATENT DOCUMENTS

| DE | 32 18 933 C2 | 10/1984 |
| DE | 100 54 867 A1 | 5/2002 |
| DE | 102 28 029 A1 | 2/2003 |

OTHER PUBLICATIONS

Deutsches Patent—und Markenamt, Office Action for German Patent Application No. 10 2015 119 900.9, Jul. 25, 2016.

*Primary Examiner* — Dirk Wright
(74) *Attorney, Agent, or Firm* — Mayer Brown LLP; Hyunho Park

(57) ABSTRACT

A position offset compensation method of a clutch for controlling power that is transmitted from an engine to a wheel of a vehicle in accordance with one of exemplary embodiments of the present invention may include confirming whether an additional torque is transferred to the clutch, if a torque that is transferred to the clutch is larger than a predetermined torque, confirming whether a speed of the clutch is less than a predetermined speed for a predetermined time according to the confirming result, confirming whether the clutch is moved to an open direction according to the confirming result, and controlling the clutch position, by calculating a compensation value of the clutch position according to the confirming result.

14 Claims, 2 Drawing Sheets

(56) References Cited

U.S. PATENT DOCUMENTS

| | | | | |
|---|---|---|---|---|
| 5,954,618 | A * | 9/1999 | Mikami | F16H 61/143 |
| | | | | 477/174 |
| 6,341,679 | B1 * | 1/2002 | Abe | F16H 61/143 |
| | | | | 192/3.29 |
| 7,077,783 | B2 * | 7/2006 | Senger | F16D 48/066 |
| | | | | 192/103 F |
| 8,271,171 | B2 * | 9/2012 | Terwart | F16D 48/066 |
| | | | | 192/90 |
| 8,577,570 | B2 * | 11/2013 | Ellis | B60W 10/02 |
| | | | | 701/67 |
| 9,322,442 | B2 * | 4/2016 | Yoon | F16D 48/06 |
| 9,377,062 | B2 * | 6/2016 | Lee | F16D 48/06 |
| 9,416,874 | B2 * | 8/2016 | Vu | F16H 61/688 |

* cited by examiner

POSITION OFFSET COMPENSATION METHOD OF CLUTCH FOR CONTROLLING POWER THAT IS TRANSMITTED FROM ENGINE TO WHEEL OF VEHICLE, AND CLUTCH POSITION CONTROL APPARATUS

CROSS-REFERENCE TO RELATED APPLICATION

This application claims priority to and the benefit of Korean Patent Application No. 10-2014-0177860 filed in the Korean Intellectual Property Office on Dec. 10, 2014, the entire contents of which are incorporated herein by reference.

BACKGROUND OF THE INVENTION (a) Field of the Invention

Exemplary embodiments of the present invention related to a clutch position control method and a device performing this.

(b) Description of the Related Art

In a vehicle that is provided with a DCT using a clutch instead of a torque converter, a clutch is opened to prevent an impact that is generated by a stall of an engine before stopping and a direction change of an engine torque.

In this moment, when a driver presses an accelerator pedal in an opened condition of a clutch during a travelling of a vehicle, a slip control of a clutch of an axis that a target gear demands is performed.

In this condition, a target speed of an engine is optimally set according to a running state of a vehicle and a clutch is controlled by considering an engine torque such that an engine speed is satisfied to be an engine target speed.

However, a clutch generates a clutch position error from temperature and abrasion. An initialization is performed at an ignition ON moment of a vehicle to determine a clutch position error compensation value so as to reduce a clutch position error.

The clutch position error compensation value is used as an equal value until next ignition ON condition. However, when a DCT vehicle has been run for a long time, there is a problem that a clutch position error compensation value is changed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a clutch position control method and a device performing this having advantages of calculating a clutch position compensation value under a uniform condition while a vehicle is performing an ignition ON and a vehicle is running so as to reducing a clutch position error and.

Objects that the present invention has to resolve is not limited to the above objects, and another objects that are not mentioned can be definitely understood by a person of an ordinary skill in the art from the below descriptions.

A position offset compensation method of a clutch for controlling power that is transmitted from an engine to a wheel of a vehicle in accordance with one of exemplary embodiments of the present invention may include confirming whether an additional torque is transferred to the clutch, if a torque that is transferred to the clutch is larger than a predetermined torque, confirming whether a speed of the clutch is less than a predetermined speed for a predetermined time according to the confirming result, confirming whether the clutch is moved to an open direction according to the confirming result, and controlling the clutch position, by calculating a compensation value of the clutch position according to the confirming result.

A clutch position control apparatus that controls power that is transmitted from an engine to a wheel of a vehicle in accordance with one of exemplary embodiments of the present invention may include a torque application portion that applies torque to the clutch, a clutch that is moved to an open direction or a close direction by the torque application portion, and a control portion that confirms whether an additional torque is transferred to the clutch, if a torque that is transferred to the clutch is larger than a predetermined torque, confirms whether a speed of the clutch is less than a predetermined speed for a predetermined time according to the confirming result, confirms whether the clutch is moved to an open direction according to the confirming result, and controls the clutch position, by calculating a compensation value of the clutch position according to the confirming result.

Detailed elements of another exemplary embodiment are included in a detailed description and accompanying drawings.

These and other objects of the present application will become more readily apparent from the detailed description given hereinafter together with the accompanying drawings. However, the present invention is not limited to the exemplary embodiments described below and may be implemented in various ways, the exemplary embodiments are provided to complete the present invention and make the scope of the present invention clear to those skilled in the art, and the present invention is defined only by the range described in claims. Throughout this specification, the same reference numerals denote the same constituent elements.

In accordance with the present invention, a clutch position compensation value is calculated during uniform condition such that there is a merit reducing a position error of a clutch, while a vehicle is performing an ignition ON and a vehicle is running.

DETAILED DESCRIPTION OF THE EMBODIMENTS

Hereinafter, exemplary embodiments of the present invention will be described with reference to accompanying drawings.

A "clutch open direction" that is used in this specification signifies a direction that a clutch is separated from an engine, and a condition that a clutch is completely opened signifies that a clutch is physically separated from an engine.

A "clutch close direction" that is used in this specification signifies a direction that a clutch faces an engine, and a condition that a clutch is completely closed signifies that a clutch physically contacts an engine.

Figure 1:
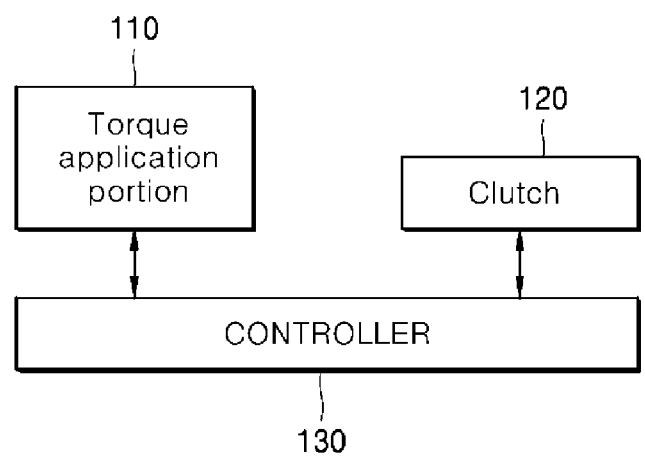
FIG. 1 is a block diagram for describing an inner structure of a clutch position control apparatus according to an exemplary embodiment of the present invention.

FIG. 1 is a block diagram for describing an inner structure of a clutch position control apparatus according to an exemplary embodiment of the present invention.

Referring to FIG. 1, a clutch position control apparatus 100 includes a torque application portion 110, a clutch 120, and a control portion 130.

A torque application portion 110 applies a torque to a clutch 120 in accordance with a control of a control portion 130.

In an exemplary embodiment, a torque application portion 110 can apply a torque that the clutch is moved to an open direction with a clutch 120 by a control of a control portion 130.

In another exemplary embodiment, a torque application portion 110 can apply a torque that the clutch is moved to a close direction with a clutch 120 by a control of a control portion 130.

A clutch 120 is moved to a direction by a torque that is applied from a torque application portion 110.

In an exemplary embodiment, a clutch 120 can be moved to an open direction, if a torque is applied to an open direction from a torque application portion 110.

In another an exemplary embodiment, a clutch 120 can be moved to a close direction, if a torque is applied to a close direction from a torque application portion 110.

A control portion 130 detects a torque that is applied to a clutch 120 and determines whether an additional torque is applied to a clutch 120 from a torque application portion 110, if the torque is larger than a predetermined value.

A control portion 130 determines whether a speed of a clutch 120 is less than a predetermined value for a predetermined time, if an additional torque is not applied to a clutch 120 by a torque application portion 110.

A control portion 130 controls a torque application portion 110 to apply a torque such that a clutch 120 is moved to an open direction, if a speed of a clutch 120 is less than a predetermined value for a predetermined time.

Thereafter, a control portion 130 detects whether a clutch 120 is moved to an open direction. A control portion 130 controls a torque application portion 110 to apply torque such that a clutch 120 is completely opened, if a clutch 120 is moved to an open direction.

A control portion 130 compares a position that a clutch is completely opened with a position of a clutch that is predetermined and can calculates a difference value between a position that a clutch is completely opened and a position of a clutch that is predetermined as a clutch position compensative value, if a position that a clutch is completely opened is not coincided with a position of a clutch that is predetermined.

A control portion 130 uses a clutch position compensation value to be able to control a position of a clutch.

Figure 2:
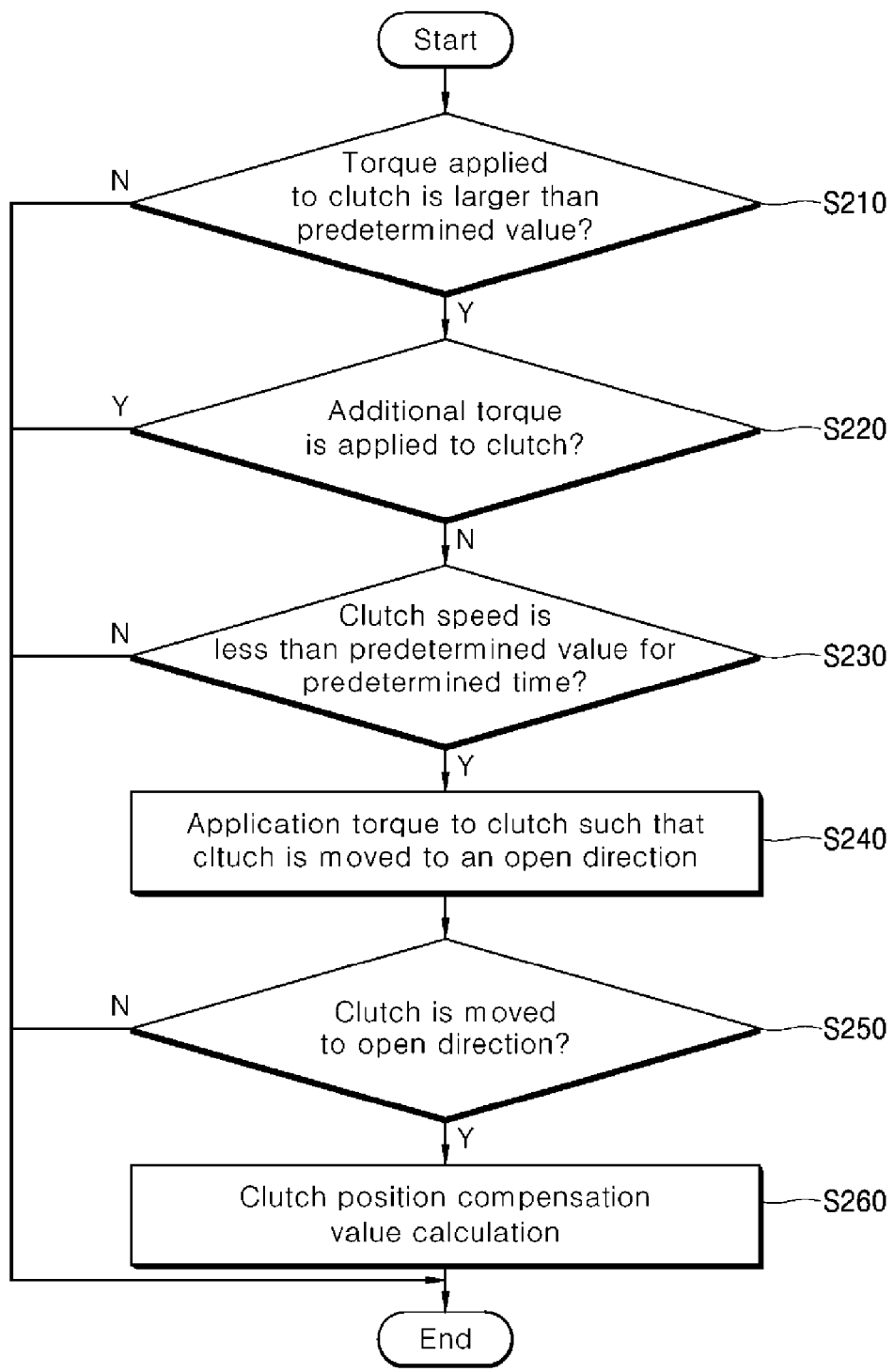
FIG. 2 is a flowchart for describing an exemplary embodiment of a clutch position control method according to the present invention.

FIG. 2 is a flowchart for describing an exemplary embodiment of a clutch position control method according to the present invention.

Referring to FIG. 2, a clutch position control apparatus 100 confirms whether a torque that is applied to a clutch is larger than a predetermined value (Step 210). A clutch position control apparatus 100 confirms whether an additional torque is not applied to a clutch (step 220), if a torque that is applied to a clutch is larger than a predetermined value.

A clutch position control apparatus 100 confirms whether a speed of a clutch is less than a predetermined value for a predetermined time (step 230). A clutch position control apparatus 100 applies a torque to a clutch such that a clutch is moved to an open direction, if a speed of a clutch is less than a predetermined value for a predetermined time (step 240).

A clutch position control apparatus 100 confirms whether a clutch is moved to an open direction (step 250). A clutch position control apparatus 100 calculates a clutch position compensation value, if a clutch is opened to an open direction (S260).

It is not shown in FIG. 2, but a clutch position control apparatus 100 can apply torque such that a clutch is completely opened, if a clutch is moved to an open direction.

And, then a clutch position control apparatus 100 compares a position that a clutch is completely opened with a position of a clutch that is predetermined and calculates a difference value between a position that a clutch is completely opened and a position of a clutch that is predetermined as a clutch position compensation value, if a position that a clutch is completely opened is not coincided with a position of a clutch that is predetermined.

A clutch position control apparatus 10 uses a clutch position compensation value to be able to control a clutch position.

Until now, a detailed exemplary embodiment has been described, but this invention may transformed to various embodiment within a range of the prevent invention. Thus, the range of the present invention may not be limited to an exemplary embodiment, and this invention may include a claim range of this invention and equal or similar embodiments.

While this invention has been described in connection with what is presently considered to be practical exemplary embodiments, referring to limited embodiment and drawings, it is to be understood that the invention is not limited to the disclosed embodiments, but, on the contrary, is intended to cover various modifications and equivalent arrangements included within the spirit and scope of the appended claims. Accordingly, this invention is only understood by below claims, and the invention is intended to cover various modifications and other equivalent arrangements.

What is claimed is:

1. A position offset compensation method of a clutch for controlling power that is transmitted from an engine to a wheel of a vehicle, comprising;
    confirming whether an additional torque is transferred to the clutch (S220), if a torque that is transferred to the clutch is larger than a predetermined torque (S210)
    confirming whether a speed of the clutch is less than a predetermined speed for a predetermined time (S230) according to the confirming result (S220);
    confirming whether the clutch is moved to an open direction (S250) according to the confirming result (S230); and
    controlling the clutch position, by calculating a compensation value of the clutch position (S260) according to the confirming result (S250).

2. The position offset compensation method of claim 1, further comprising applying the clutch with a torque such that the clutch is moved to an open direction.

3. The position offset compensation method of claim 1, wherein the confirming whether a speed of the clutch is less than a predetermined speed for a predetermined time includes
    confirming whether a speed of the clutch is less than a predetermined speed for a predetermined time, if an additional torque is not applied to the clutch.

4. A position offset compensation method of claim 1, wherein the calculating a compensation value of the clutch position according to the confirming result includes
calculating a compensation value of the clutch position, when the clutch is moved to an open direction.

5. A position offset compensation method of claim 1, wherein the controlling the clutch position, by calculating a compensation value of the clutch position according to the confirming result includes
comparing a position at which the clutch is completely opened with a position that is predetermined.

6. A position offset compensation method of claim 5, wherein the controlling the clutch position, by calculating a compensation value of the clutch position according to the confirming result includes
calculating a difference value between a position at which the clutch is completely opened and a position that is predetermined to deduce the clutch position compensation value. If the position at which the clutch is completely opened is not coincided with the position that is predetermined.

7. A position offset compensation method of claim 6, wherein the controlling the clutch position, by calculating a compensation value of the clutch position according to the confirming result further includes
controlling a position of the clutch position by using the clutch position compensation value.

8. A clutch position control apparatus that controls power that is transmitted from an engine to a wheel of a vehicle, comprising:
A torque application portion that applies torque to the clutch;
A clutch that is moved to an open direction or a close direction by the torque application portion; and
A control portion that confirms whether an additional torque is transferred to the clutch, if a torque that is transferred to the clutch is larger than a predetermined torque, confirms whether a speed of the clutch is less than a predetermined speed for a predetermined time according to the confirming result, confirms whether the clutch is moved to an open direction according to the confirming result, and controls the clutch position, by calculating a compensation value of the clutch position according to the confirming result.

9. The clutch position control apparatus of claim 8, wherein the control portion controls the torque application portion to apply torque such that the clutch is moved to an open direction.

10. The clutch position control apparatus of claim 8, wherein the control portion confirms whether a speed of the clutch is less than a predetermined speed for a predetermined time, if an additional torque is not applied to the clutch.

11. The clutch position control apparatus of claim 8, wherein the control portion calculates a compensation value of the clutch position, when the clutch is moved to an open direction.

12. The clutch position control apparatus of claim 8, wherein the control portion compares a position at which the clutch is completely opened with a position that is predetermined.

13. The clutch position control apparatus of claim 12, wherein the control portion calculates a difference value between a position at which the clutch is completely opened and a position that is predetermined to deduce the clutch position compensation value, If the position at which the clutch is completely opened is not coincided with the position that is predetermined.

14. The clutch position control apparatus of claim 13, wherein the control portion controls a position of the clutch position by using the clutch position compensation value.

* * * * *